Jan. 27, 1931.  H. F. KELLNER  1,790,050
TRAILER-SPREADER FOR DUMP VEHICLES
Filed March 22, 1930.  4 Sheets-Sheet 2

Fig. 2.

Inventor
*H. F. Kellner*

By Hiram A. Sturges
Attorney

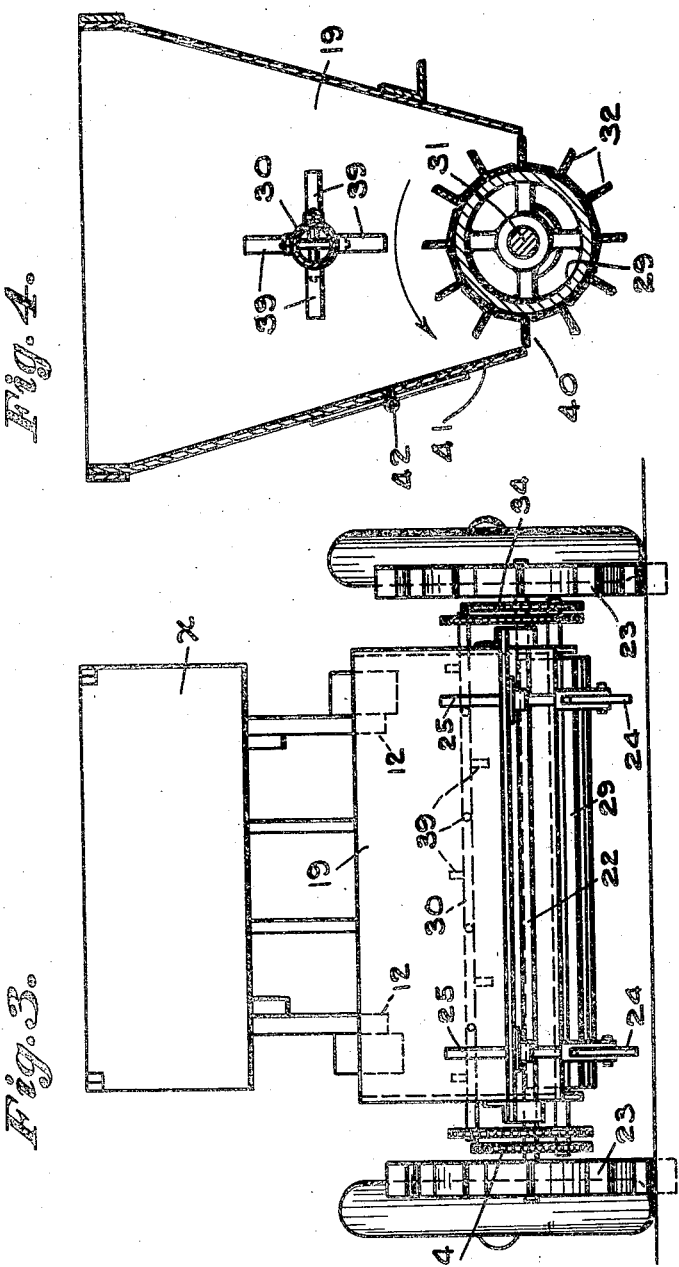

Jan. 27, 1931. H. F. KELLNER 1,790,050
TRAILER-SPREADER FOR DUMP VEHICLES
Filed March 22, 1930 4 Sheets-Sheet 4

Inventor
H. F. Kellner
By Hiram A. Sturges
Attorney

Patented Jan. 27, 1931

1,790,050

UNITED STATES PATENT OFFICE

HENRY F. KELLNER, OF SILVER LAKE, KANSAS

TRAILER SPREADER FOR DUMP VEHICLES

Application filed March 22, 1930. Serial No. 438,114.

This invention relates to a trailer for spreading sand, gravel or other loose material while attached to a dump truck or other dump-vehicle, the power for spreading being derived from its own traction wheels while operating as a trailer.

One of the objects of the invention is to provide a spreader consisting of parts which, for operation, will not depend upon any movable mechanism belonging to the dump-vehicle, but when drawn, will operate its own mechanism.

Another object is to provide a spreader which may be readily connected with or detached from a dump-vehicle so that for operation, no additional parts or changes will be required for the vehicle.

Still another object is to provide a combined trailer and material-spreader which will consist of parts which may be conveniently manufactured, will break up all adhesive parts of the material received from the dump truck and cause uniform spreading of the material.

The invention includes a trailer of such construction that the traction wheels and other parts of the trailer may be elevated so that the mechanism will remain at rest while the trailer is drawn from one place to another, casters being provided which may be adjusted for lifting the traction wheels from the ground whenever required.

With the foregoing objects in view and others to be mentioned the invention presents a new and useful construction, combination and arrangement of parts as described herein and claimed, and as illustrated in the accompanying drawings, it being understood that changes may be made in form, size, proportion of parts and minor details as found to be of advantage, said changes being within the scope of the invention as claimed.

Figure 1:
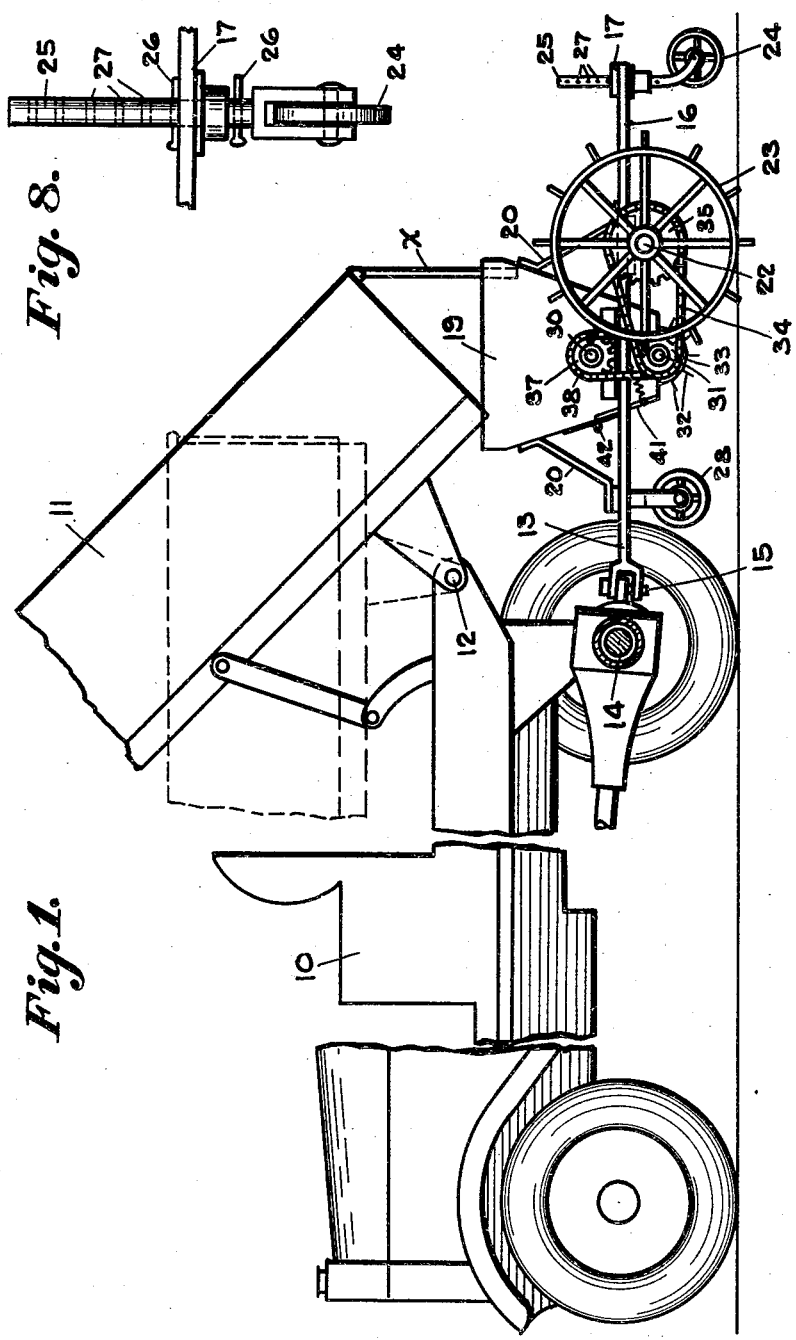

In the drawings, Fig. 1 is a view in side elevation showing the trailer-spreader connected with a dump truck, a rear wheel of the truck being removed. Fig. 2 is a plan view showing the device connected with the rear axle of a vehicle.

Fig. 3 is a rear view of the tractor-spreader connected with a dump truck. Fig. 4 is a transverse section through the hopper, agitator and cylinder.

Figure 6:
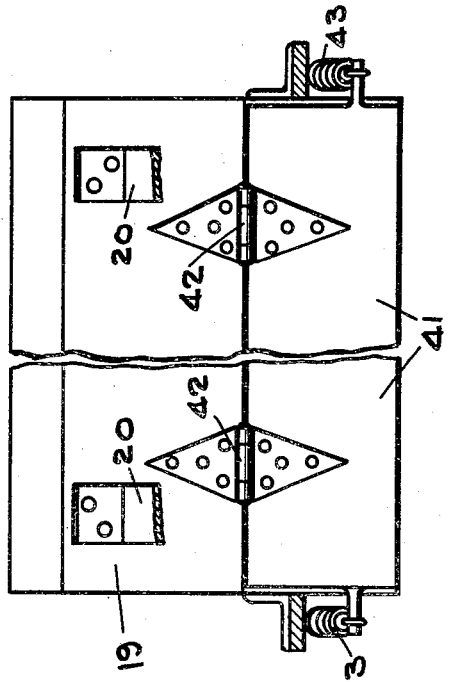
Figure 7:
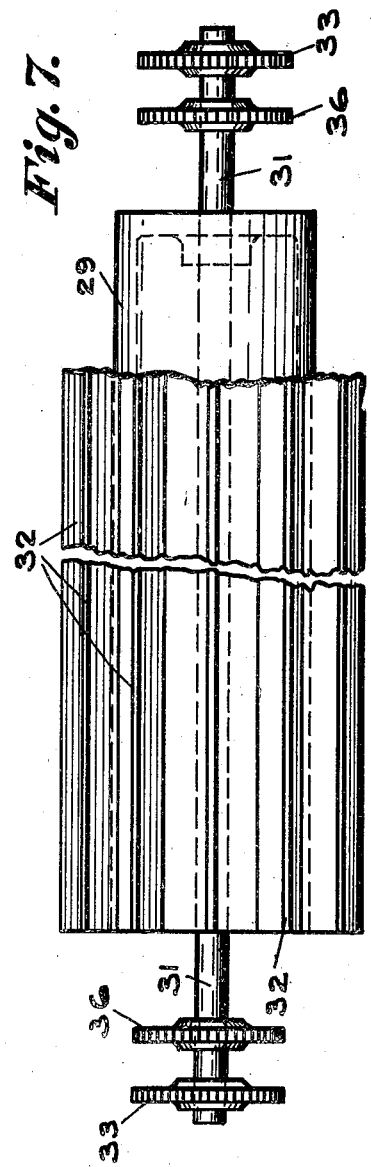
Figure 5:
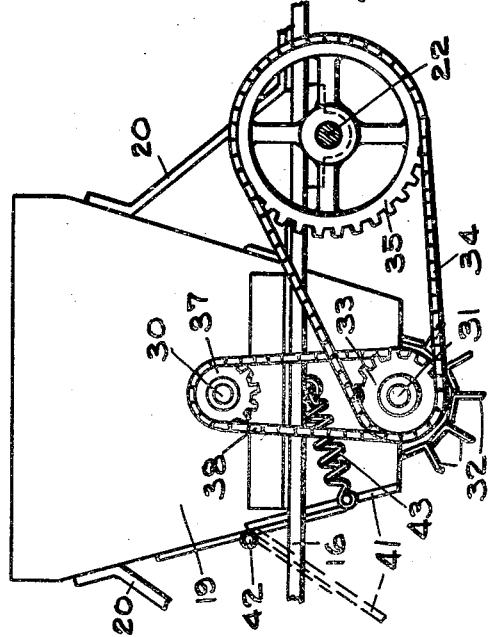

Fig. 5 is an end view of the hopper, the tractor-wheels being removed and parts of the frame and braces being broken away. Fig. 6 is a broken away side view of the hopper showing a waste-gate, the brace-supports being in section. Fig. 7 is a broken away side view of the cylinder. Fig. 8 is a detail showing adjustable features for a caster wheel.

Referring now to the drawings for a more particular description, the invention is shown and described in connection with a truck 10 provided with a dumping-box 11 with a tail-gate $x$, said box adapted to swing from its pivotal mounting 12 from its normal horizontal position to the inclined position for dumping, shown in Fig. 1 of the drawings, and it will be understood that the tongue 13 of the trailer to be described may be connected to the rear part of a dump truck or other dump-vehicle, as the connection with the rear axle or axle-housing 14 shown in Figs. 1 and 2 of the drawings, a coupling pin 15 being shown for this purpose.

In order that a combined trailer and sander may be provided I have used a frame rectangular in plan consisting of a pair of side-bars 16 connected at their ends by end-bars 17 and cross-bar 18.

Numeral 19 indicates a hopper preferably of rectangular form in plan, and by means of suitable braces 20 the hopper is supported in an upright position practically free from any excessive vibration occasioned by mechanism within the hopper depended upon for agitating and spreading the material received from the dump-box 11. Numerals 21 indicate braces for the tongue, as best shown in Fig. 2 of the drawings.

Mounted in suitable bearings on the frame mentioned is an axle or operating-shaft 22 which is provided at its ends with traction wheels 23 preferably being secured rigidly with said shaft, and, of course, providing the power for actuating the mechanism within the hopper while the vehicle 10 is moving.

Numerals 24 indicate caster wheels each having a spindle or pintle 25 mounted in the frame at the rear part of the frame, and adapted to be vertically adjusted in said frame. If the caster wheels are disposed in the position shown in Figs. 1 and 3 of the drawings the traction wheels 23 will engage the ground, and it is obvious that the caster wheels may be maintained in a plane lower than the traction wheels so that these last named wheels will not touch the ground.

Any suitable means may be provided for vertically adjusting the caster wheels 24, and for this purpose I have shown (Fig. 8) detent-pins 26 adapted to be inserted in apertures 27 which are formed in the pintles 25, and it is obvious that the caster wheels may be lowered a sufficient distance below the frame 16 to cause the weight of the frame to be supported by said caster wheels, the traction wheels, by this operation, being disposed above the ground, and this operation of elevating the traction wheels free from the ground may be practiced after the truck-load of material has been dumped and spread, and while the trailer is moved from one place to another.

During the operation of dumping and spreading the material the traction wheels engage the ground and the caster wheels 24 are disposed in the elevated position shown in Figs. 1 and 3 of the drawings.

Numerals 28 indicate a pair of caster wheels which are provided for the front part of the frame, and are used only when the tongue 13 has been detached from the axle of the dump-truck, this sometimes being desirable, and when the trailer has been detached adjustments for the casters 24 are made so that the traction wheels 23 will be disposed above the ground.

It will be understood that the use of the caster wheels is an important feature since the mechanism to be described for agitating and spreading the comminuted material should remain at rest while the hopper is empty and the trailer is being drawn from one place to another, as when the truck is being driven for re-loading.

The power derived from the traction wheels 23 is for actuating a rugose cylinder 29 and agitator shaft 30. The cylinder is provided, centrally, with a shaft 31 and its periphery is provided with parallel blades 32. The shaft 31 of the cylinder is provided at its ends with sprocket wheels 33 as best shown in Figs. 2, 5 and 7 which are rotated by means of sprocket chains 34 which engage the sprocket wheels 35 of the shaft 22.

The agitator-shaft 30 is rotated by the rotation of the cylinder-shaft 31. This last named shaft is provided, inwardly of the sprocket wheels 33, with a pair of sprocket wheels 36 as best shown in Fig. 5. The agitator shaft 30 is provided at its ends with sprocket wheels 37, and by means of the sprocket chains 38 the agitator-shaft is rotated by the rotation of the cylinder-shaft 31.

In the use of the device for spreading sand or gravel on a highway, the box 11 is swung gradually to dumping position while the truck is driven forwardly, the contents of the box falling into the hopper 19. The agitator-shaft 30 is provided with prongs 39 disposed in staggered relation relative to each other. On account of the proportion of the sprocket wheels and traction wheels the agitator-shaft will rotate at a high degree of speed, and any lumps of gravel will be completely broken and the material will be distributed and when moved to the cylinder will be delivered to the surface of the highway in practically a uniformly distributed or spread condition by moving through the passageway 40 (Fig. 4) of the hopper.

It will be noted that, in the use of the herein described spreader, the speed of the dump-truck during the operation of dumping is not a matter of importance. If the speed of the truck is increased the degree of rotation of the cylinder 29 will also be increased, and therefore the quantity of material which moves through the passageway 40 will be practically uniform regardless of the degree of speed of the truck.

It will be appreciated that the use of the rotatable cylinder 29 with its blades 32 is of great advantage for delivering the material in measured quantities. Each blade 32 consists of one of the flanges of an angle bar, the opposite flange of said bar being secured to the periphery of the cylinder 29. Since the blades 32 are disposed parallel and of uniform proportions the material delivered and moved through the passageway 40 will be practically uniform.

Numeral 41 indicates a release-gate or wing adapted to swing from hinges 42 which are mounted on one of the walls of the downwardly convergent side walls of the hopper subject to the resistance of a pair of springs 43 best shown in Figs. 5 and 6 of the drawings, each spring being mounted on an end of the hopper and connected with an end of the release-gate 41, and in operation the gate will remain closed at all times except when pieces of rock or similar obstructions enter the hopper, the arrangement of these parts tending to prevent injury or breakage of parts which might otherwise occur.

While I have used sprocket wheels and sprocket chains at both ends of the hopper it is obvious that the agitator and cylinder would be operative if rotatable power was applied to them at one end of the hopper, the traction wheels being rigidly mounted on the shaft 22.

Also while it has been stated that the traction wheels 23 are secured to the shaft 22, it is obvious that the traction wheels may have any suitable journalled bearings and the several parts would operate effectively the sprocket wheels 35 being rigidly connected with said traction wheels, and I do not wish to limit myself in this respect. Also in some instances I may omit the use of the agitator and may depend upon the cylinder for spreading the material.

I claim as my invention:—

1. In a trailer-spreader for dump vehicles, a trailer including a frame and trailer wheels, a pair of journalled traction wheels at the sides of the frame each provided with a sprocket wheel, a hopper open at its top and having a passageway at its bottom, a rugose cylinder provided with sprocket wheels at its ends and journalled in the cylinder, a pair of sprocket chains each engaging a sprocket wheel of a traction wheel and a sprocket wheel of the cylinder, and means for attaching the trailer to the dump vehicle, said trailer wheels being adjustable on the frame to cause the traction wheels to engage the ground and being adjustable for elevating said traction wheels above the ground.

2. In a trailer-spreader for dump vehicles, a trailer arranged to be attached to the rear part of the vehicle and including a frame and trailer wheels, an operating-shaft journalled in the frame of the trailer, a pair of traction wheels rigidly mounted on the operating-shaft each provided with a sprocket wheel, a hopper open at its top and bottom and mounted on the trailer frame, a rugose cylinder journalled in the hopper and having sprocket wheels connected with the sprocket wheels of the traction wheels and an agitator shaft journalled in the hopper above the cylinder and having sprocket wheels connected with the sprocket wheels of said cylinder, adjustable means on the trailer for maintaining the traction wheels in engagement with the ground to cause rotation of the cylinder and agitator-shaft by the rotation of said traction wheels while the vehicle is moving, and adjustable means on the trailer for disengaging the traction wheels from the ground.

3. In a trailer-spreader for a dump-vehicle, a trailer adapted to be secured to the rear part of the vehicle and including a frame provided with caster wheels, an axle rotatably mounted in the frame, a pair of sprocket wheels rigid with the axle, a pair of traction wheels rigid with the axle and normally engaging the ground to cause rotation thereof by movements of the vehicle, an upright hopper open at its top and bottom and mounted on said frame, a rugose cylinder axially mounted in the hopper at the lower part thereof and provided with sprocket wheels, a plurality of chains each engaging a sprocket wheel of the axle and a sprocket wheel of the cylinder, an agitator shaft journalled in the hopper and provided with sprocket wheels, a plurality of chains each engaging a sprocket wheel of the agitator shaft and a sprocket wheel of the cylinder, a spring controlled release-gate for said hopper, and means for adjusting the caster wheels for disengaging the traction wheels from the ground.

4. In a trailer-spreader for a dump vehicle, a frame having traction wheels normally engaging the ground and arranged to be drawn by the vehicle for rotating said tractor wheels, a hopper open at its top and bottom and mounted on the frame, a rugose cylinder journalled in the hopper near its bottom arranged to be rotated by the rotation of the traction wheels, an agitator shaft journalled in the hopper above the cylinder and arranged to be rotated by the rotation of said cylinder, and a plurality of caster wheels mounted on the frame adapted to be adjusted for elevating the traction wheels from the ground.

In testimony whereof, I have affixed my signature.

HENRY F. KELLNER.